United States Patent [19]

Sedlock

[11] 4,301,596

[45] Nov. 24, 1981

[54] STUD TAPE MEASURE

[76] Inventor: Thomas Sedlock, R.D. #2,, Brockway, Pa. 15824

[21] Appl. No.: 152,145

[22] Filed: May 22, 1980

[51] Int. Cl.³ .............................................. G01B 3/04
[52] U.S. Cl. ................................... 33/494; 33/137 R
[58] Field of Search ............... 33/137, 138, 139, 140, 33/174 G, 483, 485, 494, 161

[56] References Cited

U.S. PATENT DOCUMENTS

| | | | |
|---|---|---|---|
| 1,665,400 | 4/1928 | Bittner | 33/174 R |
| 2,179,658 | 11/1939 | Gallagher | 33/169 B |
| 2,563,674 | 8/1951 | Coots | 33/403 |
| 2,567,586 | 9/1951 | Werder | 33/174 G |
| 2,840,914 | 7/1958 | Buckelew | 33/138 |
| 4,138,819 | 2/1979 | Sosin | 33/476 |
| 4,228,594 | 10/1980 | Shlager | 33/429 X |

FOREIGN PATENT DOCUMENTS 785739  5/1935  France .................................. 33/138

*Primary Examiner*—Harry N. Haroian
*Attorney, Agent, or Firm*—Harvey B. Jacobson

[57] ABSTRACT

An elongated measuring tape is provided and includes first and second longitudinal marginal edges. A first of the longitudinal marginal edges includes a first linear measurement scale extending therealong beginning at one end of the tape and ascending toward the other end thereof and the second longitudinal marginal edge of the tape includes a second linear measurement scale beginning at the same end of the tape and ascending toward the remote end. The first and second scales include the same measurement increments and fractions thereof and the second scale begins, at the aforementioned one end of the tape, at a predetermined fraction of the first increment of the first scale.

2 Claims, 5 Drawing Figures

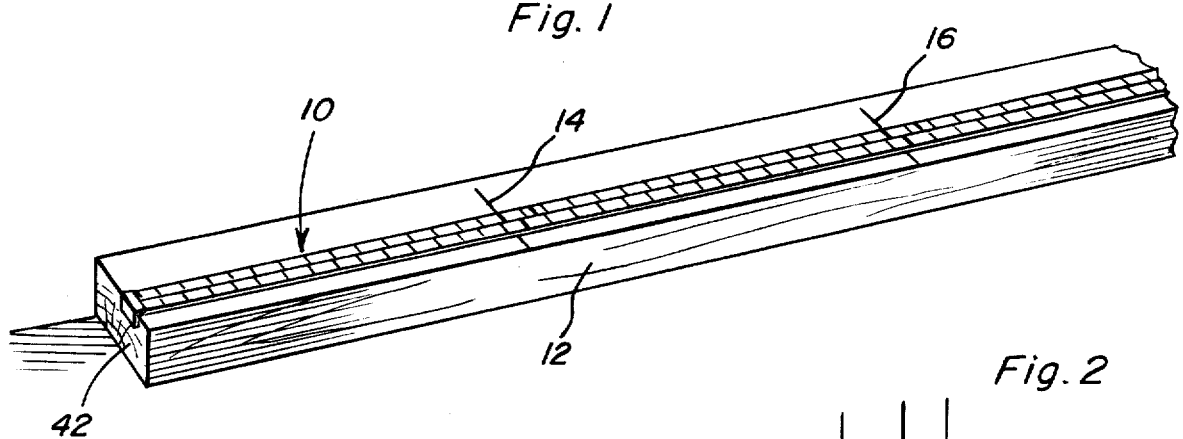
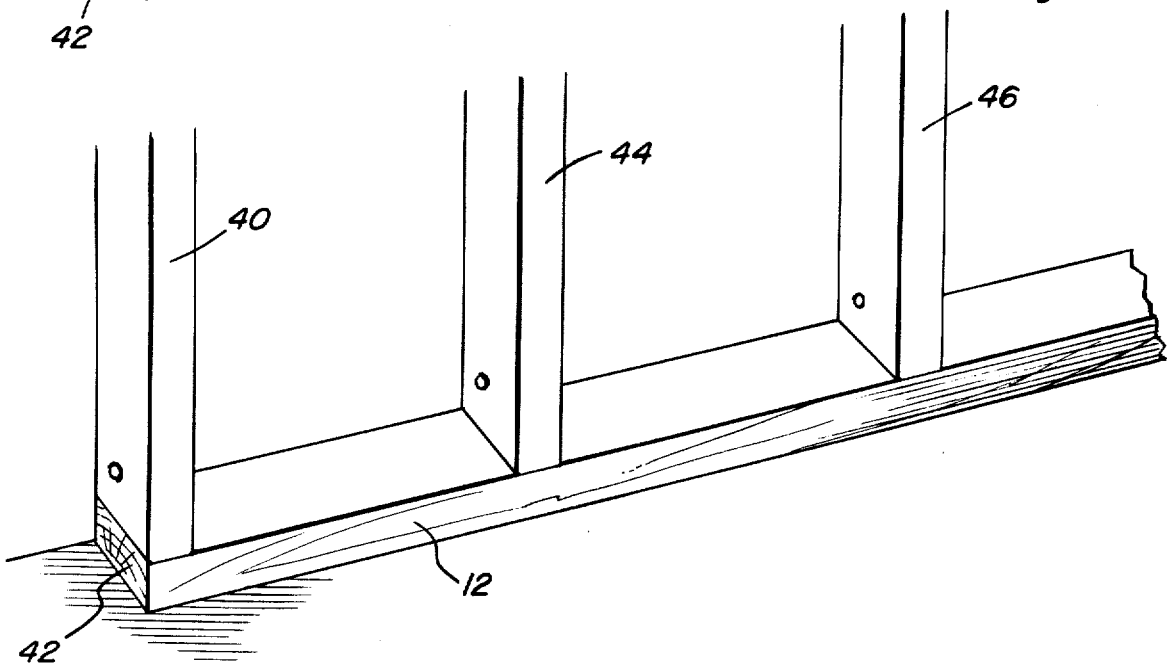
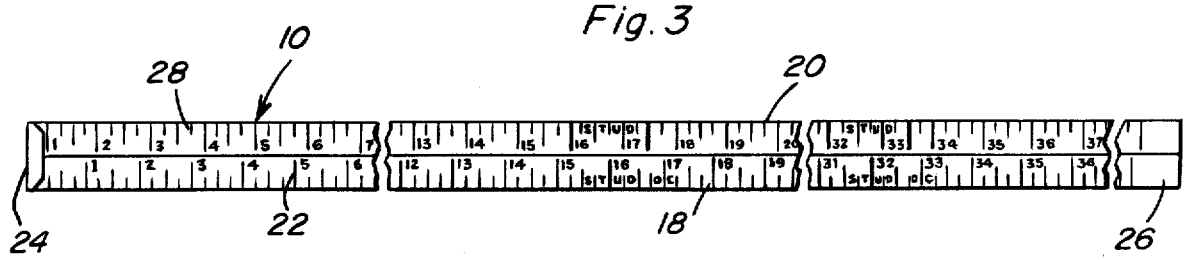
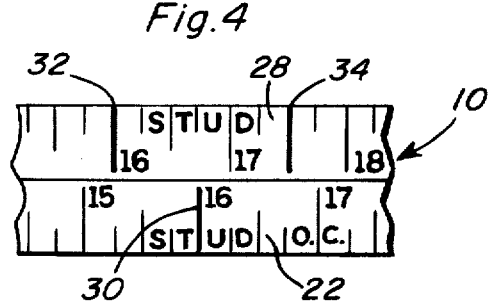
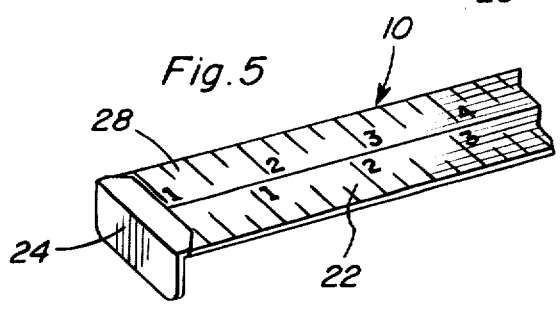

STUD TAPE MEASURE

BACKGROUND OF THE INVENTION

When erecting wall studding along sill plates and subsequently covering either one or both sides of the studding with four foot wide sheets of panelling, if the first wall stud is erected at one end of the sill plate and subsequent studs are erected on 16" centers from the first stud along the sill plate, abutting edges of adjacent four foot wall panels will be disposed along one side marginal edge of the adjacent stud. Of course, such alignment of abutting edges of adjacent wall panels at one edge of an associated stud is incorrect, inasmuch as the abutted edges of adjacent wall panels should be centered on the adjacent stud. Accordingly, a need exists for a measurement tape, or the like, whereby the first 16" location along the tape will actually be disposed 15¼" from the tape end (assuming a stud thickness of 1½"). In this manner, the abutting edges of the first wall panel and the second wall panel (assuming full overlap of the beginning edge of the first panel with the associated stud) will be centered relative to the fourth stud and each successive set of abutting wall panel edges will be similarly registered with the center of the associated stud when the studs are disposed on 16" centers.

Various forms of multiple scale measuring tapes and other similar devices have been heretofore designed such as those disclosed in U.S. Pat. Nos. 2,187,087, 3,289,305, 3,399,459 and 3,863,348. However, these previously known forms of multiple scale measuring devices are not readily adaptable for use in proper spacing of studding along wall frames being erected.

BRIEF DESCRIPTION OF THE INVENTION

The measuring tape of the instant invention includes a first conventional scale extending along one marginal edge portion thereof and a second scale (corresponding to the first scale) extending along the second longitudinal marginal edge of the tape, but with the second scale beginning a predetermined fraction of a scale increment of the first scale thereof from one end of the tape.

The main object of this invention is to provide a measuring tape which will greatly facilitate the erecting of wall studs in a manner such that subsequent wall panels to be erected may have adjacent edges thereof centered relative to corresponding studs.

Another object of this invention is to provide a measuring tape which may not only be used to advantage by experienced carpenters, but which may also be utilized to possibly greater advantage by amateur carpenters.

Another important object of this invention is to provide a measurement scale which may be utilized for conventional measuring purposes.

A further object of this invention is to provide an improved measuring tape which may be readily modified for use in conjunction with different base measuring scales and also for use with different thickness lumber.

A final object of this invention to be specifically enumerated herein is to provide a measuring tape in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part thereof, wherein like numerals refer to like parts throughout.

BRIEF DESCRIPTION OF THE DRAWING FIGURES

FIG. 1 is a fragmentary perspective view of a sill plate with the tape measure of the instant invention being utilized in conjunction therewith in order to mark intended locations of studs therealong;

FIG. 2 is a fragmentary perspective view of wall studding with the stud members spaced threalong in a manner facilitated by the instant invention;

FIG. 3 is a fragmentary plan view of the tape measure of the instant invention;

FIG. 4 is an enlarged fragmentary view of the tape measure; and

FIG. 5 is a fragmentary perspective view of the first end portion of the tape measure on somewhat of an enlarged scale.

DETAILED DESCRIPTION OF THE INVENTION

Referring now more specifically to the drawings, the numeral 10 generally designates the tape measure of the instant invention. The tape measure is illustrated in FIG. 1 as being disposed along a sill plate 12 for the purpose of marking the sill plate as at 14 and 16 for the desired location of studs along the sill plate.

Referring now more specifically to FIGS. 3, 4 and 5 of the drawings, it may be seen that the tape measure 10 includes first and second longitudinal marginal edges 18 and 20 extending therealong. The marginal edge 18 has a first scale (in inches and fractions thereof) thereon extending from a first end 24 of the tape measure 10 and ascending toward the other end 26 thereof. Likewise, the second longitudinal marginal edge 20 of the tape measure 10 has a second scale 28 thereon extending along the tape measure 10 from the first end 24 thereof and ascending toward the second end 26 of the tape measure 10.

Of course, the tape measure 10 may be of any desired length, but it will be noted from FIGS. 4 and 5 of the drawings that while the first scale 22 begins at 0 at the first end 24 of the tape measure 10, the second scale 28 actually begins at ¾" at the first end 24 of the tape measure 10. Accordingly, assuming the first stud location to be at the first end 24 of the tape measure 10, the second stud position (studs being set on 16" centers) will be centered relative to the 16" location 30 on the first scale with the second stud extending from 16" location 32 on the second scale 28 to the 17½" location 34 on the second scale 28.

With attention now invited more specifically to FIG. 2 of the drawings, the first stud 40 is to be positioned at the first end 42 of the sill plate 12. When marking the sill plate 12 to determine the edges of the subsequent studs 44 and 46 adjacent the first stud 40 to be erected, the tape measure 10 is placed on the sill plate 12 in the manner illustrated in FIG. 1 of the drawings and the second scale 28 is utilized to mark the sill plate 12 as at 14 and 16 at the 16" and 32" locations on the second scale 28. Then, the stud 40 may be erected and the studs 44 and 46 may be subsequently erected, the mark 14 being 15¼" from the first end 42 of the sill plate 12 and the second mark 16 being 16" from the mark 14. Accordingly, the first wall panel section (48 inches in width) to be erected on the studs 40, 44 and 46 will have a first edge portion thereof flush with the side of the stud 40 remote from the stud 44 and the second edge thereof centered on the stud spaced on center 16" to the right of the stud 46. Of course, after the first three studs 40, 44 and 46 have been erected, the marking of correct positions of subsequent studs is carried out in the same manner using the second scale 28 while the tape is maintained in position as illustrated in FIG. 1.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A stud location tape comprising an elongated tape measure including opposite side longitudinal marginal edges, a first of said marginal edges including a first ascending linear measurement scale extending therealong beginning at one end of the said tape and ascending toward the other end thereof, the second of said marginal edges including a second ascending linear measurement scale having its lower end at said one end of said tape and ascending toward the other end thereof, said first and second scales each being in the same measurement increments and fractions thereof, the lower end of said second scale beginning, at said one end of said tape, at a predetermined fraction of the first increment of said first scale, said first and second linear measurement scales being readable from a single side marginal edge of said tape measure, said fraction of said first increment comprising $\frac{3}{4}$", said first scale including stud center marks thereon spaced predetermined distances apart along said tape and said second scale including pairs of opposite stud side surface marks thereon with the spacing between each pair of stud side surface marks being bisected by a corresponding stud center mark.

2. The combination of claim 1 wherein said tape measure scales comprise scales marked in inches and fractions of inches.

* * * * *